United States Patent [19]

Gersmann et al.

[11] 4,269,446
[45] May 26, 1981

[54] DISPLACEABLE SEAT FOR AUTOMOTIVE VEHICLES

[75] Inventors: Klaus Gersmann, Wulfertshausen; Oskar Gruber, Garching, both of Fed. Rep. of Germany

[73] Assignee: Bayerische Motoren Werke Aktiengesellschaft, Munich, Fed. Rep. of Germany

[21] Appl. No.: 22,488

[22] Filed: Mar. 21, 1979

[30] Foreign Application Priority Data

Mar. 29, 1978 [DE] Fed. Rep. of Germany ....... 2813534

[51] Int. Cl.$^3$ ............................................. A47C 1/032
[52] U.S. Cl. ................................................. 297/341
[58] Field of Search ........................ 247/340, 341, 342

[56] References Cited

U.S. PATENT DOCUMENTS

| | | | |
|---|---|---|---|
| 2,809,689 | 10/1957 | Garvey et al. | 297/341 |
| 2,826,241 | 3/1958 | Himka | 297/341 |
| 2,942,646 | 6/1960 | Himka et al. | 297/341 |
| 3,957,312 | 5/1976 | Bonnaud | 297/341 |
| 4,131,316 | 12/1978 | Pallant et al. | 297/341 |
| 4,159,147 | 6/1979 | Kiyomitsu et al. | 297/341 |

*Primary Examiner*—William E. Lyddane
*Attorney, Agent, or Firm*—Craig and Antonelli

[57] ABSTRACT

A seat for an automotive vehicle, such as a passenger car, is disclosed. The seat comprises a seat part and a seatback joined to the seat part via a device which includes apparatus for adjusting the tilt of the seatback relative to the seat part as well as a connecting linkage to a pivot, about which pivot the seatback can be tilted forward toward the seat part after a tilt blocking mechanism between the seatback and seat part has been released, the seat part during the tilting motion of the seatback being displaced forwardly by way of the connecting linkage. The connecting linkage includes a guide structure for supporting and vertically adjusting the position of the seat and a fitting of the seatback which is pivotably mounted at the seat part. A locking arrangement couples the guide and fitting for rotation and forward displacement of the seat part during the tilting motion.

9 Claims, 4 Drawing Figures

DISPLACEABLE SEAT FOR AUTOMOTIVE VEHICLES

BACKGROUND AND SUMMARY OF THE INVENTION

The invention relates to a seat for automotive vehicles, especially for passenger cars, with a seat part and a seatback joined to the seat part via a device comprising means for adjusting the tilt of the seatback as well as a connecting linkage for the seatback to a pivot, about which pivot the seatback can be tilted in the forward direction toward the seat part after releasing a tilt blocking means cooperating with the seat part frame, wherein the seat part, during this tilting motion, is displaced forwardly by way of the connecting linkage.

Such a seat, facilitating in a two-door passenger car the access to the back seat, is known from DOS [German Unexamined Laid-Open Application] 2,729,639. One disadvantage in this seat is that it cannot be adjusted with regard to its level. Accordingly, the conventional seat does not make it possible to optimize the seating position of the driver of the vehicle with respect to the operating elements.

Optimization of the seating position can be achieved with the vehicle seat known from DOS 1,405,918. This seat does comprise a seat part which can be level-adjusted by way of parallelogram guide means, but the seat part cannot be displaced toward the front by tilting in order to facilitate access to the back seat.

Thus, an object of the present invention is to provide a vehicle seat of the aforementioned type which is level-adjustable with a minimum of structural parts.

This and other objects of the present invention are attained by providing that the connecting linkage is formed from a seatback fitting and a guide means, and that this guide means serves for adjusting the vertical position of the seat, wherein the seatback fitting can be coupled with this guide means for rotation therewith by way of locking means. According to the disclosed embodiments this locking means is adjustable in its position for vertically adjusting the position of the seat.

Due to the fact that, in the device of the present invention, the seatback fitting is coupled, to form the connecting linkage, with a guide means by way of the locking means, the advantage is obtained of a minimum expenditure in structural parts. Furthermore, by this arrangement, a simple construction of the device is obtained, and the device can also be readily mounted to the seat. By means of the afore-described coupling system, the vertical adjustment of the seat can furthermore remain unaffected by the forward displacement of the seat part, so that the selected seat level still exists after a forward displacement.

In a preferred embodiment, it is possible, according to additional features of the present invention, to fashion the means provided for the tilt adjustment of the seatback as well as for the vertical adjustment of the seat in a single construction, whereby manufacture and assembly are simplified and thus the production costs are reduced. If the aforementioned means are furthermore arranged at the seatback fitting and, according to another feature, connected kinematically, the advantage is obtained that the tilt adjustment and the seat level adjustment can be effected via a single hand lever, in each case independently of each other.

A further advantage in addition to this convenience in operation is that of a simple construction, if the hand lever and the seatback fitting, to afford support against the frame of the seat part, are located on the pivot axis of the guide means pertaining to the seat.

These and other objects, features and advantages of the present invention will become more apparent from the following description when taken in connection with the accompanying drawings, which show, for purposes of illustration only, several embodiments in accordance with the present invention.

DETAILED DESCRIPTION OF THE DRAWINGS

Figure 1:
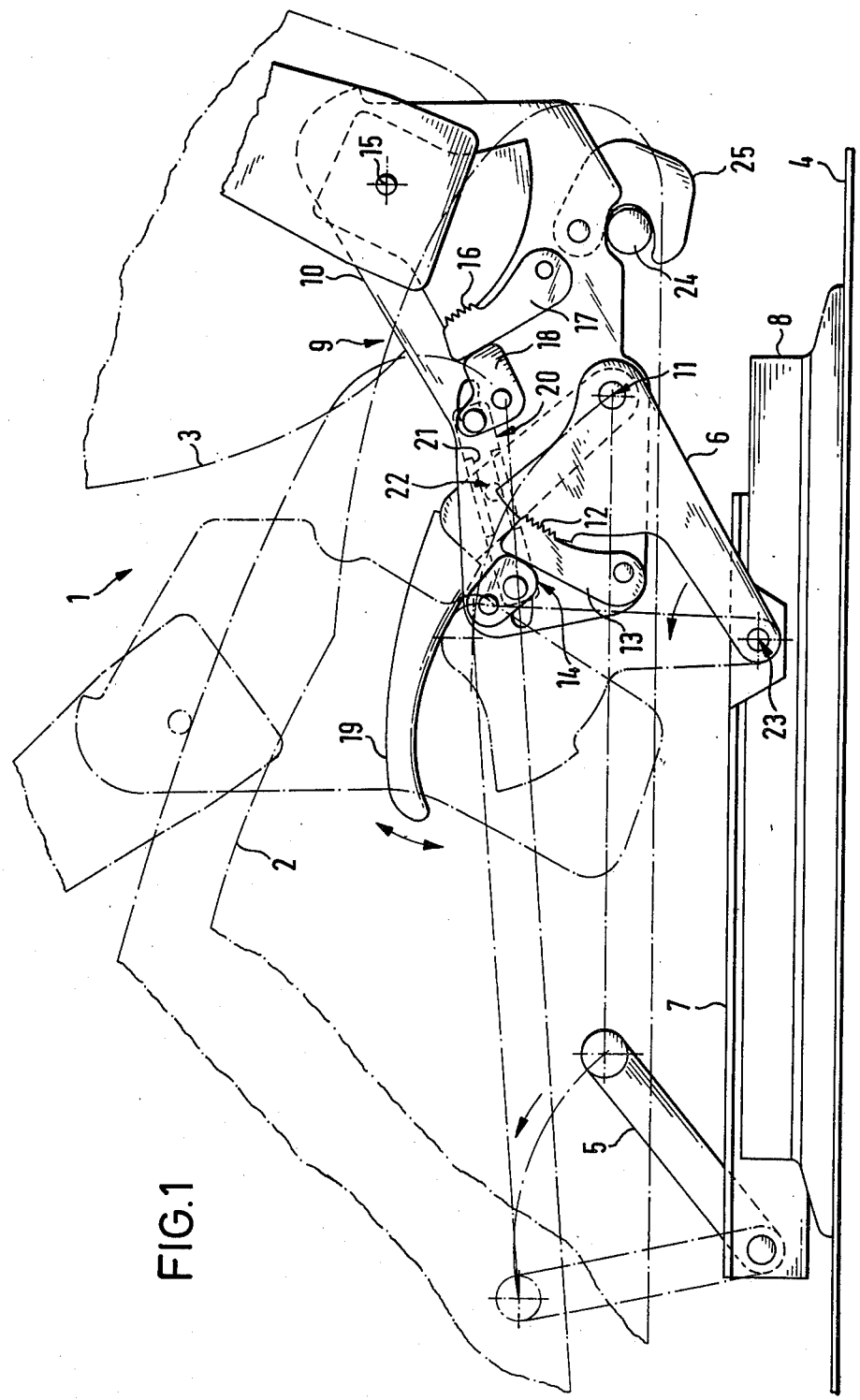
FIG. 1 shows a first embodiment of a device according to the present invention wherein the seatback fitting carries blocking elements for the tilt adjustment for the seatback and blocking elements for the vertical seat adjustment and is thereby coupled with the guide means.

In FIG. 1, a vehicle seat 1 is illustrated with a seat part 2 and a seatback 3 which is tilt-adjustable. The seat part 2 is connected with the floor 4 of a passenger car by way of guide means extended essentially in a parallel orientation. It is possible, for example, to provide four guide means, of which merely two are shown in FIG. 1, namely a forward guide means 5 and a rear guide means 6. The guide means 5 and 6, preferably arranged in close proximity to the longitudinal side of the vehicle seat 1, are articulated to a bracket 7, the bracket 7 being connected with a guide rail 8 mounted to the vehicle floor 4 so that it can slide therein and can be locked into position therein. Thus, the seat 1 can be shifted in the longitudinal direction of the vehicle to adjust a seat position.

The seatback 3 is connected to the seat part 2 via a device 9 for tilt adjustment. The device 9 comprises a seatback fitting 10 rotatably mounted on the pivot axle 11 of the guide means 6 on the seat side. As can be seen from FIG. 1, the guide means 6 comprises a toothed segment 12 coaxially arranged with respect to the pivot axle 11. A pawl 13 is engaged with the toothed segment 12, this pawl being pivotably mounted on the seatback fitting 10; by way of an operable cam 14, the pawl can be brought into and out of engagement with the toothed segment.

FIG. 1 does not illustrate springs, several of which are connected to the guide means to compensate for the weight of the seat 1 and which rest on the vehicle floor. Furthermore, springs are provided, above all, for compensating for the weight of a passenger, for which purpose at least one spring engages, on the one hand, the guide means 6 and, on the other hand, the backrest fitting 10.

If the pawl 13 is brought out of engagement with the toothed segment 12 at the guide means 6—and thus the locking position of the vertical seat adjusting arrangement is released—the seat 1 can be vertically-adjusted by the user of the seat via the guide means 5,6 and the remaining guide means, not shown, as well as the aforementioned springs. Once the desired height of the seat 1 is attained, the guide means 6 is arrested again by the toothed segment 12 and pawl 13 on the seatback fitting 10, the pawl 13 being arrested by cam 14 mounted on the backrest fitting 10.

The seatback 3 is arranged to be pivotable about the axle 15 for tilt adjustment relative to the seatback fitting 10. A further toothed segment 16 is fixedly joined to the seatback 3, this segment being arranged coaxially to the pivot axle 15. A separate pawl 17 engages the toothed segment 16, this pawl being pivotably mounted at the seatback fitting 10; by way of an operable cam 18, this pawl can be placed into and out of engagement with the segment.

If the pawl 17 is brought out of engagement with the toothed segment 16 of the seatback 3—and thus the locking position of the tilt adjustment is released—the seatback 3 can be brought into the respectively desired inclination. Once this inclination has been attained, the seatback 3 is again locked into position via the toothed segment 16 and the pawl 17 at the seatback fitting 10.

Preferably the cam 14 for the vertical seat adjustment and the cam 18 for the seatback tilt adjustment are operated by way of a hand lever 19 common to both of them. The hand lever 19, for reasons of compactness, is arranged on the pivot axle 11 of the guide means 6 on the seat side.

As can furthermore be seen from FIG. 1, both cams 14 and 18 are connected via a coupling rod 20 so that they rotate in opposite directions, whereby the above-described adjustments of the seat height and the seatback tilt can be effected independently of each other. The coupling rod 20 cooperates via a linear guide element 21 with a trunnion 22 arranged at the hand lever 19. The hand lever 19 assumes a middle position once the seat level setting as well as the tilt setting of the seatback 3 have been determined. For changing one or the other setting, the hand lever 19 must be pivoted from the middle position into one or the other direction.

With the hand lever 19 being in the middle position, the seatback 3 as well as the guide means 6 serving for the vertical seat adjustment are locked together with the seatback fitting 10. Thus, a rigid connection is provided for the seatback 3 over the seatback fitting 10 and the guide means 6 with the pivot axle 23 of the guide means 6 on the vehicle floor. Since furthermore the seatback fitting 10 during its second connection with the seat part 2 merely rests on a pin 24 projecting from the frame of the seat part, a connecting linkage has thus been created, by way of which the seatback 3 can be tilted forwardly to displace the seat part 2 forwardly, as illustrated by the dashed lines in FIG. 1. It can further be seen from the drawing that, upon tilting the seatback 3 toward the front in the driving direction, the seat part 2 is displaced in the forward direction, since the seat part 2 is connected with the seatback fitting 10 via the pivot axle 11 of the guide means 6 on the seat side. To avoid an unintended tilting of the seatback 3, the latter is connected to a catch or locking hook 25 cooperating with the pin 24.

Figure 2:
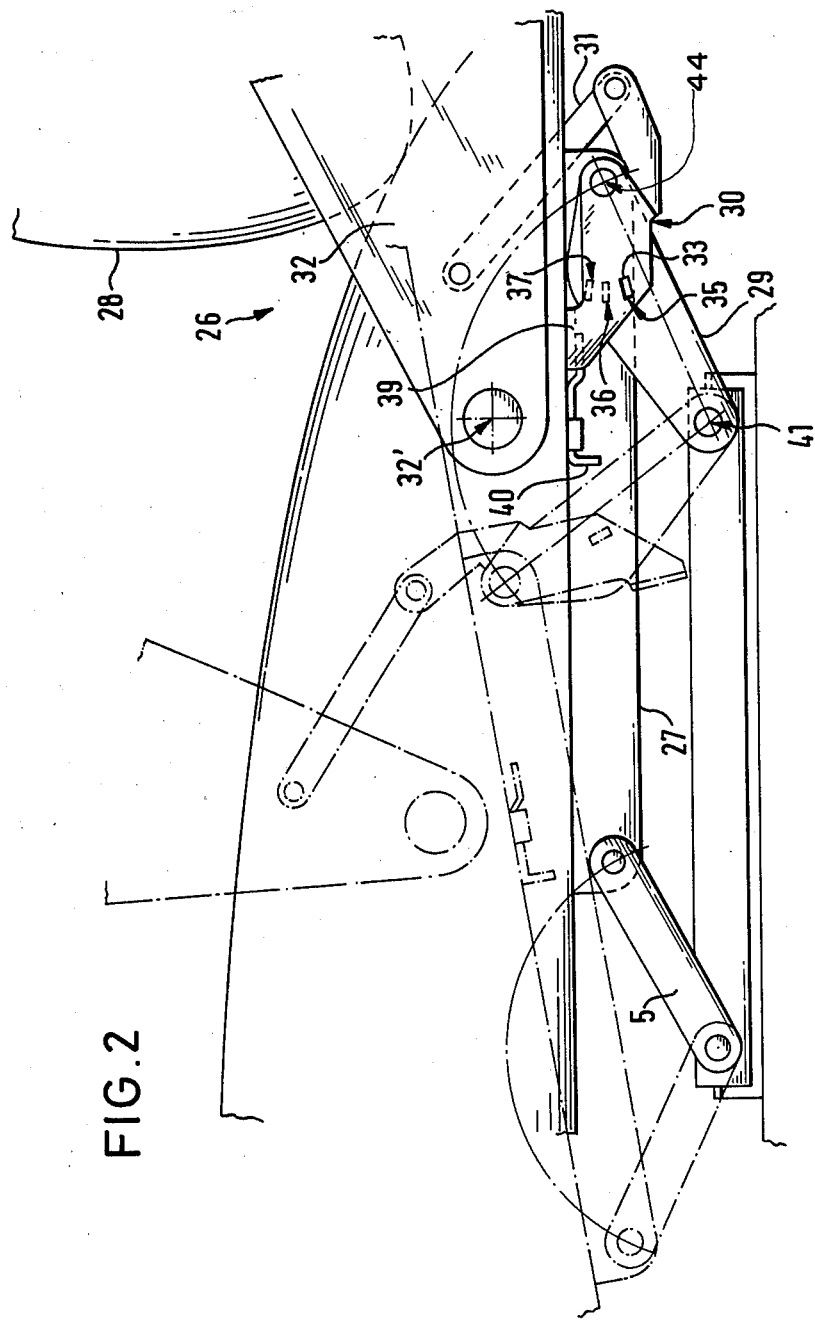
FIG. 2 shows another embodiment according to the present invention of a device wherein an intermediate lever is provided between the guide means and the seatback fitting, this lever being coupled to the guide means via means for the vertical adjustment of the seat.

In the device 26 shown in FIG. 2 for a vehicle seat, not illustrated in detail, wherein the seat part 27 can be displaced toward the front by means of a tiltable seatback 28, an intermediate lever 30 is rotatably mounted on the pivot axle 44 of the guide means 29 on the seat side. The intermediate lever 30 is articulated to the seatback fitting 32 via a connecting rod 31. The seatback fitting 32 is arranged on the seat part 27 to be pivotable about the axis 32'. Also, the seatback 28 is connected to the seatback fitting 32 so that it is adjustable in its inclination.

Figure 3:
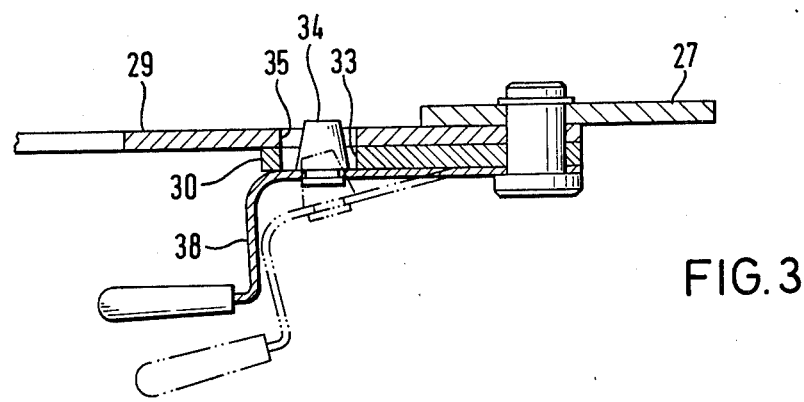
FIG. 3 shows an example of the locking engagement of the intermediate lever according to FIG. 2 with the guide means.

The intermediate lever 30 can be coupled for rotation with the guide means 29 via means for a vertical seat adjustment. According to FIG. 3, the intermediate lever 30 can have, for this purpose, a perforation 33 to guide a locking means 34. The locking means 34 engages, depending on the desired vertical adjustment of the seat, one of the cutouts 35, 36 or 37 provided at the guide means 29. To operate the locking means 34, the latter is preferably arranged on a flexible leaf spring 38 provided with a handle.

As can be seen from FIG. 2 as well, the intermediate lever 30 comprises a stop 39 contacting the seat part 27 to support the vehicle seat. By way of the stop 39, the intermediate lever 30 is locked together with the seat part 27 by means of a manually operable slide 40. Only after this locking action has been released is it possible to tilt the seatback forwardly. Tilting the seatback forwardly, the seatback fitting 32 pivots about its axis 32' and, by way of the connecting rod 31 and the intermediate lever 30, sets the guide means 29 coupled for rotation by way of the locking means 34 into a pivotal motion about the axis 41. Due to the connection of the guide means 29 via its pivot axle 44 on the seat side with the seat part 27, the latter is displaced toward the front during this step.

The above-mentioned slide can also be fashioned to be remote-controlled (not illustrated). For this purpose, the slide is preferably connected with the operating handle of a blocking means preventing tilting of the seatback.

Figure 4:
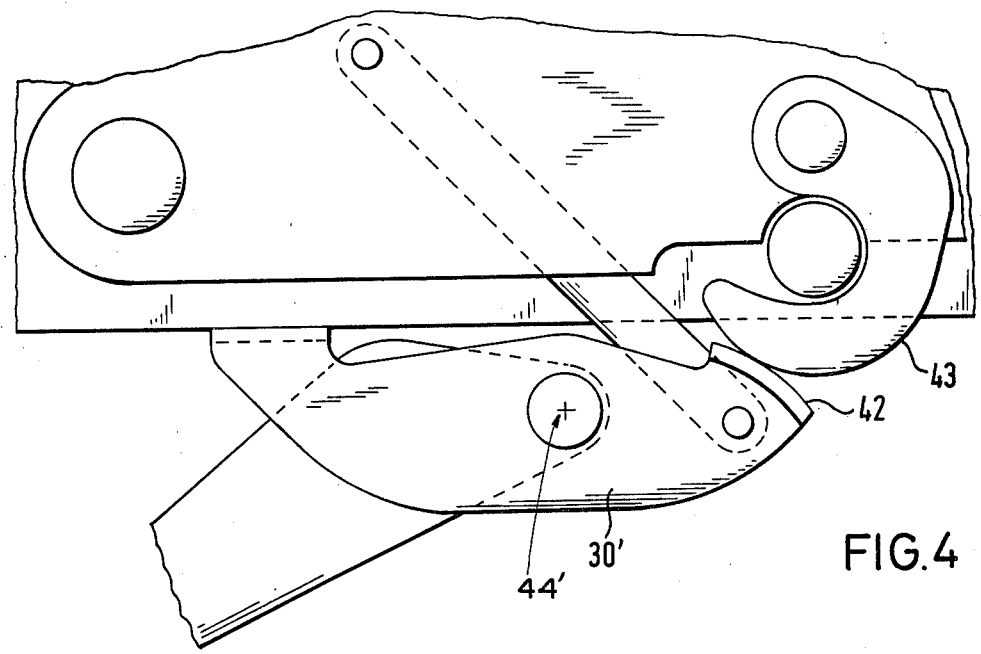
FIG. 4 illustrates another type of locking means for the intermediate lever.

The aforementioned slide, however, can also be omitted, if an intermediate lever 30' according to FIG. 4 is equipped with a further stop 42 cooperating with the blocking hook 43 of a blocking means preventing tilting of the seatback.

While we have shown and described only several embodiments in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

What is claimed is:

1. A seat for an automotive vehicle, such as a passenger car, comprising a seat part and a seatback, means connecting the seat part with the floor of the vehicle to permit vertical adjustment of the position of the seat and forward displacement of the seat part when the seatback is tilted forward toward the seat part, said connecting means including spaced apart first and second guide means which are essentially parallel and which extend between and are pivotably connected to said seat part and respective pivot means adjacent the vehicle floor, said first guide means being connected to said seat part at its rear in the area of the lower end of the seatback and said second guide means being positioned forwardly of said first guide means, means for adjusting the tilt of the seatback relative to the seat part, said means for adjusting the tilt of the seatback relative to the seat part including a seatback fitting which extends between and is pivotably connected to said seatback and said seat part, locking means coupling said first guide means and said seatback fitting for rotation so that with forward tilting motion of the seatback and the seatback fitting the seat part is displaced forwardly, said locking means being adjustable in its position for vertically adjusting the position of the seat, and releasable tilt blocking means for preventing rotation of the coupled first guide means and seatback fitting.

2. The seat according to claim 1, wherein said seatback fitting is rotatably mounted on a pivot axle of the first guide means, said locking means locking the first guide means in an adjustable position at the seatback fitting for rotation and forward displacement of the seat part during said tilting motion and for vertical adjustment of the position of the seat.

3. The seat according to claim 2, wherein the locking means includes a first toothed segment on said first guide means, and a cooperating first pawl arranged on said seatback fitting, a first cam being provided on said seatback fitting for controlling said first pawl.

4. The seat according to claim 3, wherein said means for adjusting the tilt of the seatback relative to the seat part further comprises a second toothed segment arranged at the seatback to adjust the tilt and a cooperating second pawl mounted on said seatback fitting, a second cam also being mounted on said seatback fitting means for controlling said second pawl, said first and second cams being operably connected to a single hand lever which is supported on the pivot axle of the guide means.

5. The seat according to claim 4, wherein said first and second cams are connected via a coupling rod for rotation in opposite directions with movement of said coupling rod, the coupling rod cooperating via a guide member with said hand lever which is pivotable about said pivot axle of the guide means from a middle position in two directions.

6. The seat according to claim 2, wherein said releasable tilt blocking means comprises a releasable locking hook and a pin arranged at a frame of the seat part, and wherein said seatback fitting is supported on said pin as well as on said pivot axle.

7. The seat according to claim 1, wherein an intermediate lever is rotatably supported on a pivot axle of the first guide means, said lever being in articulate connection with the seatback fitting and being adjustably locked in position with respect to said first guide means by said locking means for vertically adjusting the position of the seat when the seat part is not displaced forwardly during said tilting motion, the intermediate lever resting on a frame of the seat part via a stop on the intermediate lever.

8. The seat according to claim 7, wherein the intermediate lever has a perforation to guide said locking means which engages in one of several cutouts provided in said guide means for the vertical adjustment of the seat, said locking means being arranged on said intermediate lever by a flexible leaf spring.

9. The seat according to claim 7, wherein said releasable tilt blocking means includes means for releasably locking said intermediate lever with the frame of said seat part.

* * * * *